(12) United States Patent
Holowachuk (10) Patent No.: US 10,562,575 B2
(45) Date of Patent: Feb. 18, 2020

(54) DRIVE ASSEMBLY CLEARING MEMBER

(71) Applicant: 1845067 Alberta Ltd., Lloydminster (CA)

(72) Inventor: James Lawrence Holowachuk, Lloydminster (CA)

(73) Assignee: 1845067 Alberta Ltd., Lloydminster (CA)

( * ) Notice: Subject to any disclaimer, the term of this patent is extended or adjusted under 35 U.S.C. 154(b) by 306 days.

(21) Appl. No.: 15/448,943

(22) Filed: Mar. 3, 2017

(65) Prior Publication Data

US 2018/0251170 A1 Sep. 6, 2018

(51) Int. Cl.
*B62D 55/088* (2006.01)

(52) U.S. Cl.
CPC .................. *B62D 55/0882* (2013.01)

(58) Field of Classification Search
CPC ...... B62D 55/088; B62D 55/0882; B60S 1/68
See application file for complete search history.

(56) References Cited

U.S. PATENT DOCUMENTS

| | | | | |
|---|---|---|---|---|
| 2,560,307 A | * | 7/1951 | Slemmons | B62D 55/0882 305/110 |
| 2,937,883 A | | 5/1960 | Alcoriza | |
| 4,830,439 A | | 5/1989 | Collins | |
| 5,226,703 A | * | 7/1993 | Norman | B62D 55/0882 305/107 |
| 5,697,683 A | * | 12/1997 | Arulandu | B62D 55/0882 305/107 |
| 5,725,292 A | | 3/1998 | Keedy | |
| 5,820,230 A | * | 10/1998 | Freeman | B62D 55/088 305/107 |
| 5,863,104 A | | 1/1999 | Satzler | |
| 6,019,443 A | | 2/2000 | Freeman | |
| 6,527,347 B2 | | 3/2003 | Brawley | |
| 7,210,750 B2 | | 5/2007 | Yamamoto | |
| 7,591,515 B2 | | 9/2009 | Breton | |
| 8,167,384 B2 | | 5/2012 | Tan | |
| 2002/0195875 A1 | | 12/2002 | Brawley | |

FOREIGN PATENT DOCUMENTS

| | | |
|---|---|---|
| CN | 201695436 U | 1/2011 |
| GB | 604545 A | 7/1948 |
| IT | 1191023 B | 2/1988 |
| JP | 2002308160 A | 10/2002 |
| JP | 2011230637 A | 11/2011 |
| WO | 19830001234 A1 | 4/1983 |

OTHER PUBLICATIONS

Combined Search and Examination Report received Jul. 31, 2018 in UK Application No. GB1802924.9, 7 pgs.
Canadian Examination Report received Jan. 28, 2019 in CA Application No. 2,959,887, 3 pgs.

* cited by examiner

*Primary Examiner* — Jason R Bellinger
(74) *Attorney, Agent, or Firm* — Michael A. Bondi; Moss & Barnett (57) ABSTRACT

For track vehicles having drive assemblies that are susceptible to buildup of mud and debris that can result in damage to the track and drive assembly, clearing members are provided that clear buildup while avoiding contact with components of the track vehicle as the track frame oscillates.

16 Claims, 9 Drawing Sheets

DRIVE ASSEMBLY CLEARING MEMBER

FIELD OF THE INVENTION

The present invention relates to drive assembly clearing members for track vehicles.

BACKGROUND OF THE INVENTION

It is known in the art of landscaping and construction that tractors comprising a track assembly are well suited for travelling on muddy and un-level ground. Wheeled vehicles may not have proper traction for such conditions and tend to get stuck during operation.

Some track-type tractors utilize a drive assembly that drives the tractor's track, wherein the track is supported by a track frame that allows track oscillation as the track moves along un-level ground. Typically, under muddy conditions, the components of the track assembly and drive assembly of a track-type tractor may be covered with mud and debris during operation. Damage to the track may occur during operation as result of the design of the track and drive assemblies being susceptible to the buildup of mud and debris on certain components. This damage can shorten the life of a track assembly and drive, and ultimately has been a source of much down time.

Figure 2A:
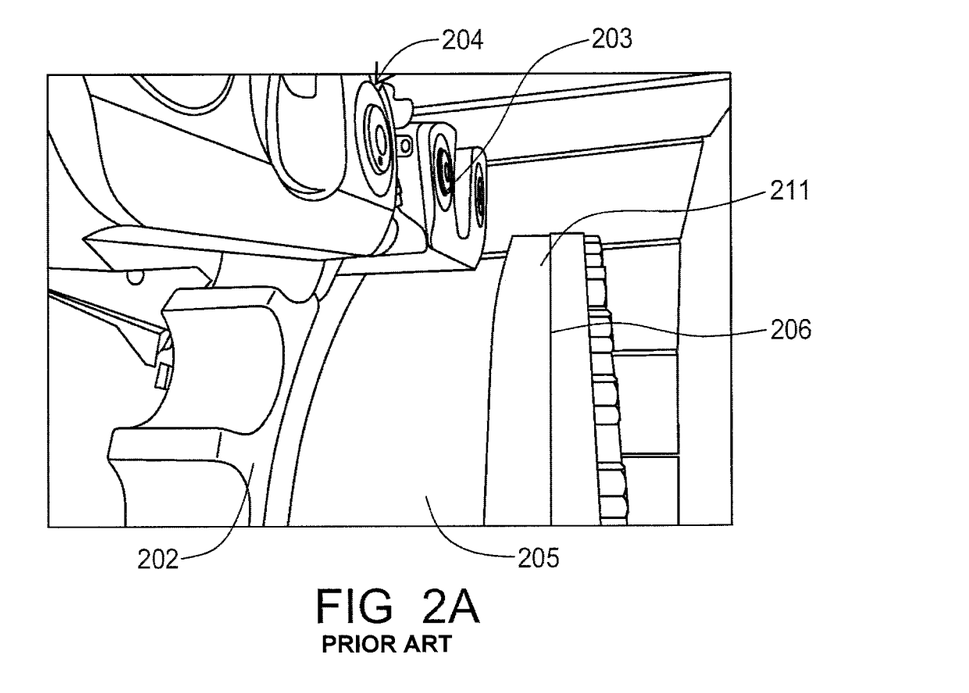
FIG. 2A is a photograph of a drive assembly and track assembly of a typical track vehicle.

For example, on the Caterpillar D6, D5, and D4 high drive tractors, the drive assembly is built with a larger outer flange to hold the gear carrier. As shown in FIG. 2A, the drive assembly also has an inner sprocket that drives the series of track links which in turn drives the track of the tractor. There is a gap between the outer flange and the inner sprocket which is susceptible to the buildup of mud and debris. The outside of the track links run along the gap between the outer flange and the inner sprocket drive with a clearance of about 0.75 inches between the bottom of the link and the drive assembly.

When a buildup of mud and debris is present at the gap between the outer flange and the inner sprocket, the series of links may flex when running around the drive sprocket. This may result in the drive sprocket skipping a link and shocking the internal drive gears causing damage to the drive. Furthermore, as the series of track links flex due to mud and debris buildup at the gap, damage to the series of track links can occur. Damage to track links ultimately shortens the life of the track assembly.

To reduce damage to a track assembly, after-market assemblies and track links have been implemented to overcome the problems described above. However, track failures still occur as a result of mud and debris buildup causing the track links to flex.

It is known that clearing devices could be implemented to clear debris from components of track vehicle such as the drive assembly. However, tractors such as the Caterpillar D6, D5, and D4 high drive tractors only have certain locations where welding of a clearing member could occur without compromising the structure of the tractor and its components. Furthermore, the track frame of certain tractors, such as the Caterpillar D6, D5, and D4, oscillate as the track moves along un-level ground. This can cause a clearing device mounted on the track frame to make contact with the drive assembly as the track frame oscillates resulting in damage to the clearing device, the drive assembly or both.

What is needed, therefore, is an improved means for clearing debris from specific areas of the drive assembly that are susceptible to debris buildup, and avoiding compromising the structural integrity of the tractor and its components.

SUMMARY OF THE INVENTION

The present invention therefore seeks to provide drive assembly clearing members for track vehicles.

According to a first broad aspect of the present invention, there is provided a track vehicle comprising:
 a track, the track driven by a track link;
 a track frame for supporting the track;
 a drive assembly adjacent to the track frame for driving the track link, the drive assembly comprising:
   an outer flange and an inner sprocket with a gap between the outer flange and the inner sprocket,
 wherein the sprocket is configured to engage with the track link;
 wherein the gap is susceptible to buildup of mud and debris; and
 a clearing member mounted on the track frame adjacent to the drive assembly for clearing at least some of the mud and debris, the clearing member extending partially into the gap between the outer flange and the inner sprocket.

In some exemplary embodiments of the first aspect, the track frame comprises a pivot point adjacent to the gap allowing for oscillation of the track frame as the track makes contact with an uneven ground surface; and wherein the clearing member is mounted to the track frame at the pivot point. Preferably, the clearing member is mounted to the track frame at the pivot point in a manner such that the clearing member avoids contact with the drive assemble as the track frame oscillates along the pivot point.

In some other exemplary embodiments of the first aspect, the clearing member comprises a mounting member mounted on the track frame and a clearing bar attached to the mounting member. The clearing bar extends partially into the gap between the outer flange and the inner sprocket. Preferably, the clearing bar is removably attached to the mounting member. It is also preferable that the clearing bar is attached to the mounting member in a manner such that is adjustably extends into the gap between the outer flange and the inner sprocket.

In some other exemplary embodiments of the first aspect, it is preferable that the clearing member is welded to one of the non-stress points of the track frame.

According to a second broad aspect of the present invention, there is provided a clearing member for mounting to a track vehicle, wherein the track vehicle comprises a track, the track driven by a track link; a track frame for supporting the track; and a drive assembly adjacent to the track frame for driving the track link, the drive assembly comprising an outer flange and an inner sprocket with a gap between the outer flange and the inner sprocket, wherein the sprocket is configured to engage with the track link; and wherein the gap is susceptible to buildup of mud and debris;
 the clearing member is attachable to the track frame of the track vehicle and configured to extend partially into the gap between the outer flange and the inner sprocket and clear at least some of the mud and debris.

In some exemplary embodiments of the second aspect, the track frame comprises a pivot point adjacent to the gap allowing for oscillation of the track frame as the track makes contact with an uneven ground surface; and wherein the clearing member is mounted to the track frame at the pivot point. Preferably, the clearing member is mounted to the track frame at the pivot point in a manner such that the clearing member avoids contact with the drive assembly as the track frame oscillates along the pivot point.

In some other exemplary embodiments of the second aspect, the clearing member comprises a mounting member mounted on the track frame and a clearing bar attached to the mounting member. The clearing bar extends partially into the gap between the outer flange and the inner sprocket. Preferably, the clearing bar is removably attached to the mounting member. It is also preferable that the clearing bar is attached to the mounting member in a manner such that it adjustably extends into the gap between the outer flange and the inner sprocket.

In some other exemplary embodiments of the second aspect, it is preferable that the clearing member is welded to one of the non-stress points of the track frame.

BRIEF DESCRIPTION OF THE DRAWINGS

In the accompanying drawings, which illustrate exemplary embodiments of the present invention.

Exemplary embodiments of the present invention will now be described with reference to the accompanying drawings.

DETAILED DESCRIPTION OF EXEMPLARY EMBODIMENTS

Throughout the following description, specific details are set forth in order to provide a more thorough understanding to persons skilled in the art. However, well-known elements may not have been shown or described in detail to avoid unnecessarily obscuring the disclosure. The following description of examples of the technology is not intended to be exhaustive or to limit the invention to the precise form of any exemplary embodiment. Accordingly, the description and drawings are to be regarded in an illustrative, rather than a restrictive, sense.

The present invention is directed to clearing members that clear buildup of mud and debris from the drive assembly of certain types of track vehicles. In particular, the present invention is directed to clearing members that clear buildup of mud and debris from the drive assembly of certain types of track vehicles that have an oscillating track frame.

Figure 1:
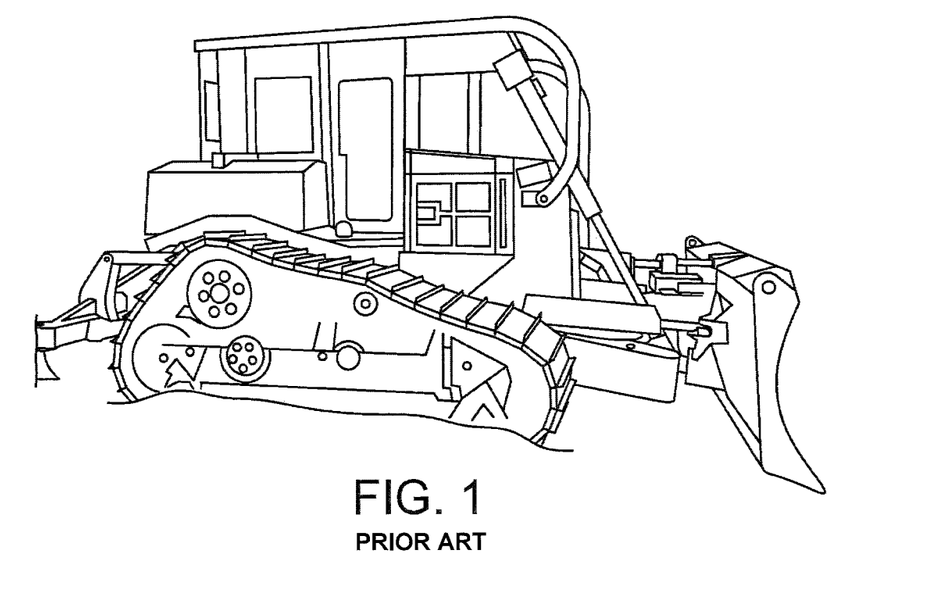
FIG. 1 is a photograph of a typical track vehicle with an oscillating frame.
Figure 2B:
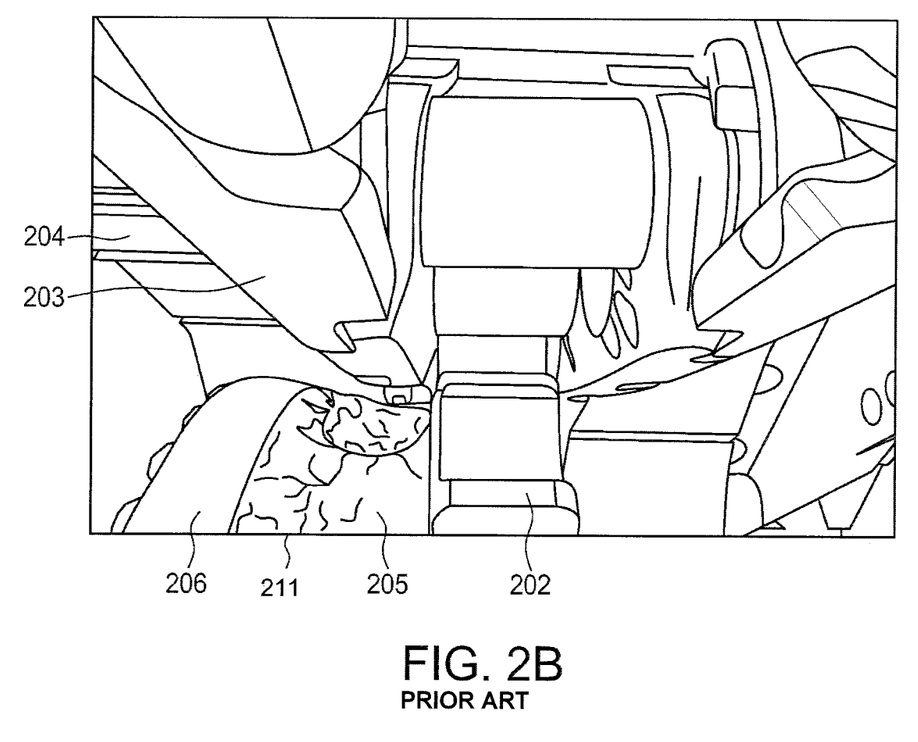
FIG. 2B a photograph of a drive assembly and track assembly of a typical track vehicle.

A track vehicle that utilizes an oscillating track frame that allows the track to oscillate as the track moves along un-level ground is shown in FIG. 1. Track vehicles of this kind may have design problems that facilitate the buildup of mud and debris in the area of the drive that runs the track assembly. For example, on the Caterpillar D6, D5, and D4 high drive tractors, the drive assembly is built with a larger outer flange to hold the gear carrier. As shown in FIG. 2A and FIG. 2B, the drive assembly 211 also has an inner sprocket 202 that drives the series of track links 203 which in turn drives the track 204 of the tractor. There is a gap 205 between the outer flange 206 and the inner sprocket 202 which is susceptible to the buildup of mud and debris. The outside of the track links 203 runs along the gap 205 between the outer flange 206 and the inner sprocket drive 202. The track links typically have a clearance of about 0.75 inches between the bottom of the link 203 and drive assembly 211 (at the gap 205).

Figure 3:
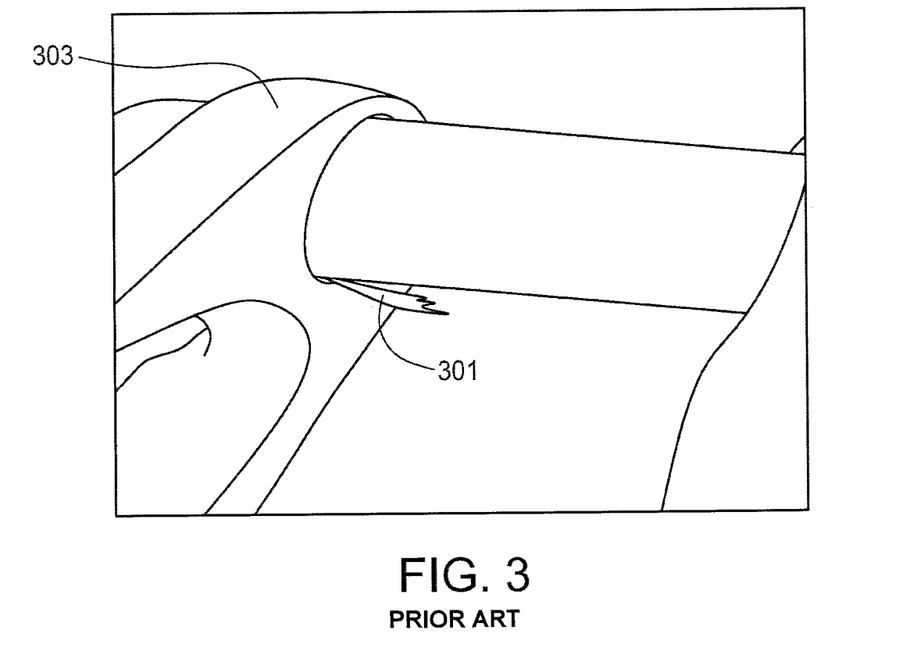
FIG. 3 is a photograph of a damaged track link.

When operating a track vehicle in conditions that entail moist soil, snow or mud, a buildup of material and debris may begin to form at the gap 205 between the outer flange 206 and the inner sprocket 202. FIG. 2B shows the buildup of debris at the gap. This may cause the track links 203 to flex when running around the drive sprocket 202. As a track link 203 comes around the sprocket 202, material that has built up at the gap 205 may begin to lift one side of the track link 203. This can result in a side flex of the track as it rotates. As a result of the flex, the seals that hold lubrication for the track link 203 may be damaged allowing the lubricating oil to sweat out and ultimately cause damage to the track due to lack of lubrication. By having the link assembly flex up on one side, it runs off-centre when engaging with the sprocket 202 causing the sprocket 202 to run tight against the outside of the track assembly. This potentially presses debris against the inside of a track link 203 which may damage the seals of the link bushing. FIG. 3 shows damage 301 to the track link 303 as a result of the sprocket engaging tightly to one side of the track assembly because of the flex in the track assembly caused by the buildup of debris at the gap.

Figure 4:
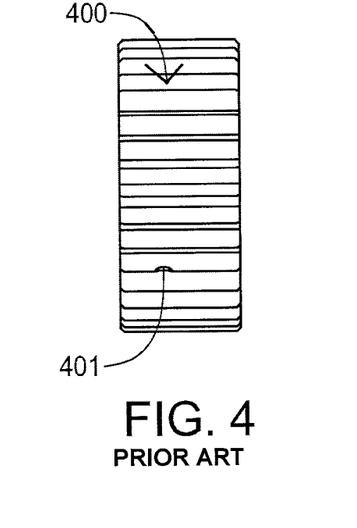
FIG. 4 is a photograph of a damaged internal gear.

A buildup of material at the gap 205 may also cause the drive sprocket 202 to skip a link of the track assembly, potentially damaging the internal drive gears. FIG. 4 shows damage 401 to the internal drive gears 400 caused by the drive sprocket 202 skipping in the link assembly.

Damage to track links ultimately shortens the life of the track assembly. Approximately a twenty to fifty percent reduction of life of the track assembly and other drive components may be attributed to the problems resulting from the buildup of debris at the gap.

Figure 5:
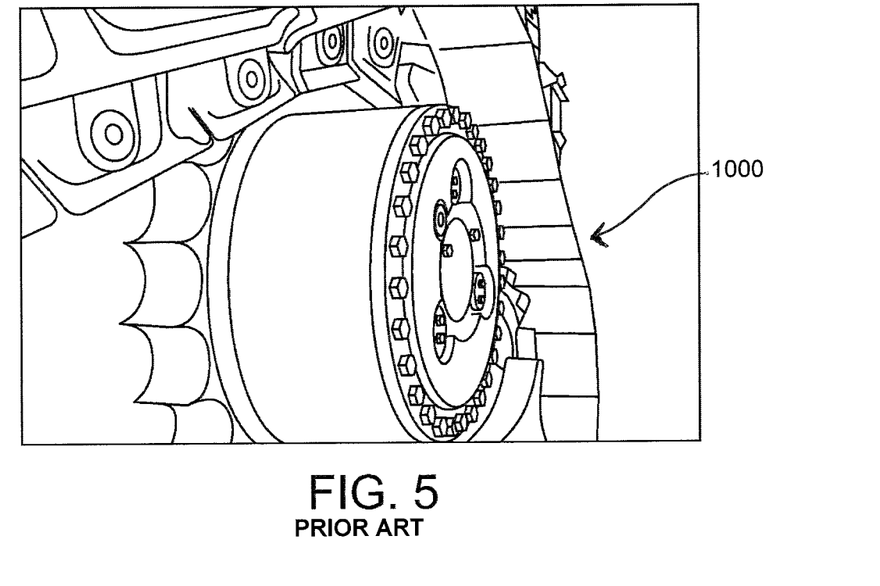
FIG. 5 is a photograph of a drive assembly and track assembly of a typical track vehicle that is not susceptible to build-up.

Track vehicles, such as the Caterpillar D4, D5, and D6, have the design flaw described above as a result of having a single reduction drive and having an outer flange that holds the internal carrier assembly. As shown in FIG. 5, the Caterpillar D7 and D8 track vehicles 1000 have a double reduction carrier assembly in which case they have a different design and no outer flange. As a result of this, there is more clearance between the link assembly and the drive assembly. This allows mud and debris to be pushed off the drive assembly and thus does not have the same debris buildup problems as in the Caterpillar D4, D5, and D6 models.

The present invention involves an improved means for clearing debris from areas of a drive assembly that are susceptible to debris buildup, while avoiding compromising the structural integrity of the tractor and its components. Preferably, in embodiments wherein a track vehicle comprises an oscillating track frame, the present invention avoids contact with the drive assembly or the other components of the track vehicle as the track frame oscillates.

Figure 6A:
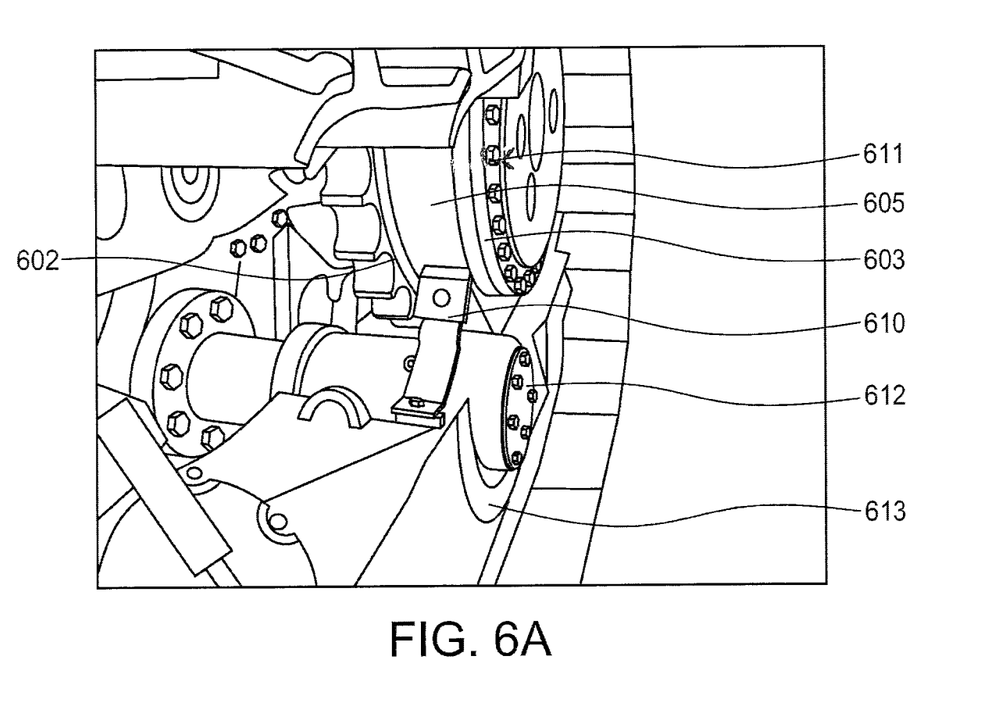
FIG. 6A is a photograph of a first embodiment of the present invention mounted on a track vehicle.
Figure 6B:
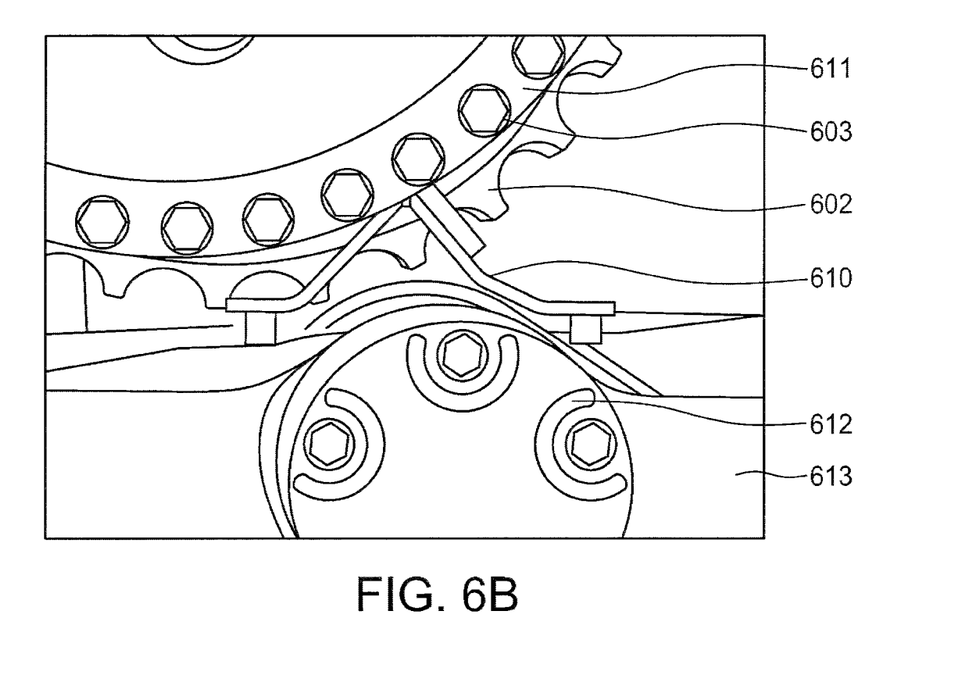
FIG. 6B is a photograph of the first embodiment of the present invention mounted on a track vehicle.
Figure 6C:
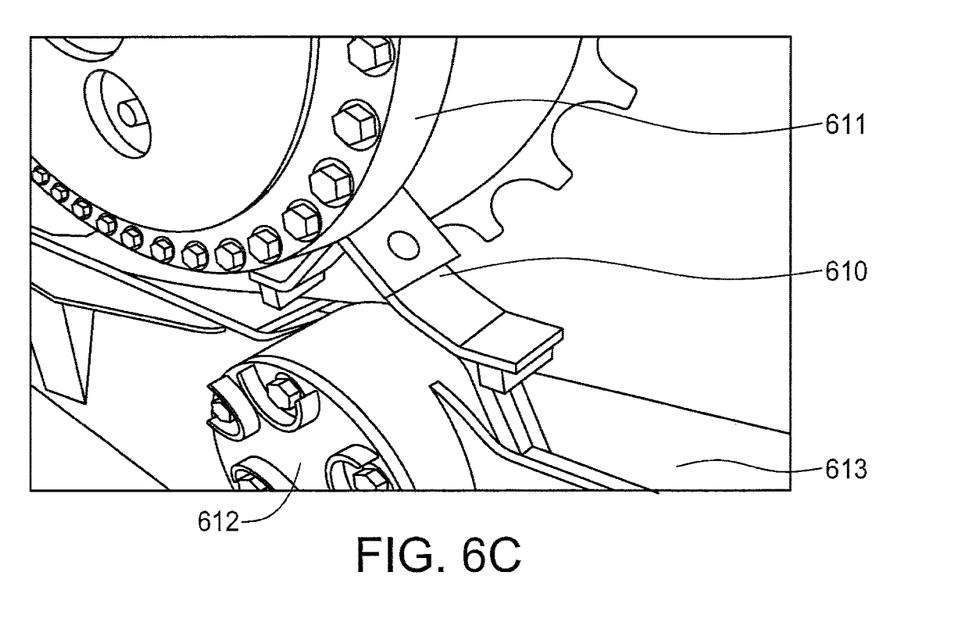
FIG. 6C is a photograph of the first embodiment of the present invention mounted on a track vehicle.

As generally shown in FIGS. 6A to 6C, a clearing member 610 according to one exemplary embodiment of the present invention, mounted on a track vehicle, is for clearing debris from certain areas of the drive assembly that are susceptible to debris buildup. During operation of the track vehicle, the drive assembly 611 rotates allowing the clearing member 610 to clear at least some of the mud and debris from areas of the drive assembly 611 that are susceptible to debris buildup. With the drive assembly clean 611, no flexing occurs on the track link assembly, thus reducing the associated problems described above. This can maximize the life of the track assembly, drive and other structural moving components of the drive.

According to the first exemplary embodiment of the present invention there is provided a clearing member 610 for mounting to a track vehicle.

The clearing member 610 of the first embodiment of the present invention may be mounted on a track vehicle so that it is able to clear debris from areas of the drive assembly 611. Furthermore, the clearing member 610 should be mounted on the track frame as mounting on other areas of the track vehicle may jeopardize the integrity of the vehicle's structure. On track vehicles that comprise an oscillating track frame 613, the clearing member 610 should be mounted at a location such that the clearing member 610 avoids contact with the drive assembly 611 or other components of the track vehicle while the track frame 613 oscillates. During oscillation, a track frame 613 pivots along a pivot point 612 resulting in areas of the track frame 613 alternatingly travelling away from and towards the drive assembly 611. Areas of the track frame that are closer to the pivot point 612 are less affected by oscillation and thus travel less. Preferably, the clearing member 610 is mounted on the track frame in a location that is essentially at the pivot point 612 during oscillation. By positioning the clearing member in this manner, contact between the clearing member and the drive assembly 611 may be avoided while the track frame oscillates.

In some preferred embodiments, the clearing member 610 is configured to be mounted onto a track vehicle comprising a drive assembly 611 adjacent to the track frame 613 for driving the track links. The drive assembly 611 comprises an outer flange 603 and an inner sprocket 602 with a gap 605 between the outer flange 603 and the inner sprocket 602. The clearing member 610 is, preferably, mounted on the track frame adjacent to the drive assembly 611 for clearing at least some of the mud and debris. The clearing member 610 extends partially into the gap 605 between the outer flange 603 and the inner sprocket 602. During track vehicle operation, the drive assembly rotates allowing the clearing member 610 of the present invention to clear at least some of the mud and debris between the outer flange 603 and the drive sprocket 602.

Figure 7A:
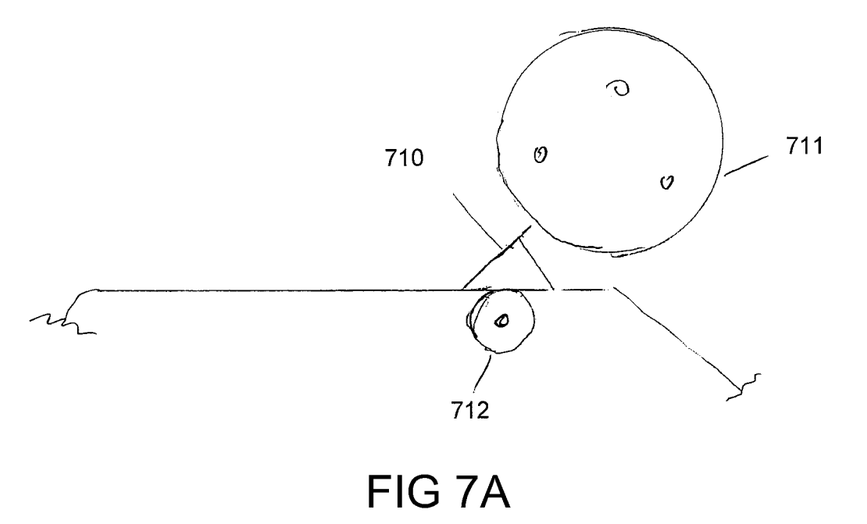
FIG. 7A is a simplified side view of a second embodiment of the present invention mounted on a track vehicle.
Figure 7B:
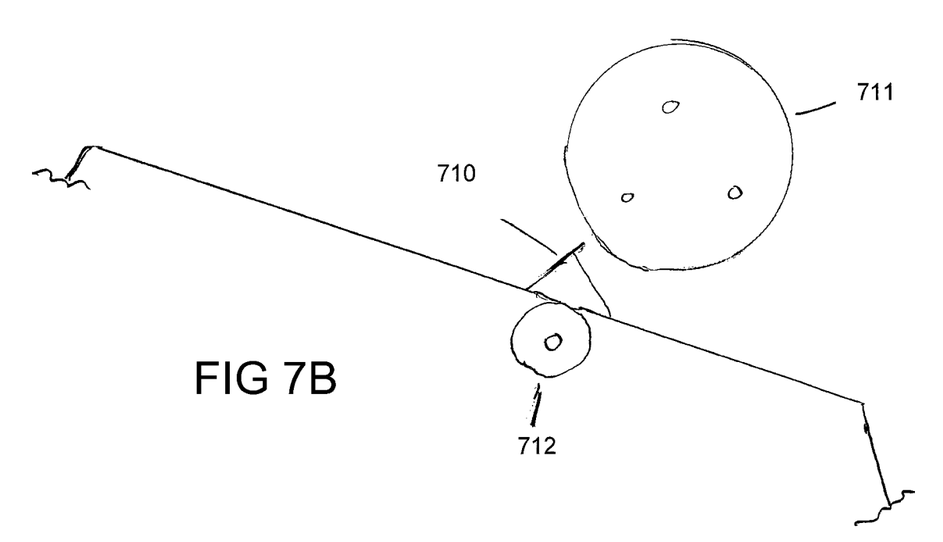
FIG. 7B is a simplified side view of a second embodiment of the present invention mounted on a track vehicle.

FIGS. 7A and 7B illustrate a clearing member 710 according to an exemplary embodiment of the of the present invention mounted on the track frame in a location that is essentially at the pivot point 712 thus avoiding contact with drive assembly 711 during oscillation of the track frame.

The clearing member of is preferably made of steel. The clearing member of some embodiments of the present invention may be of unitary construction.

Figure 8A:
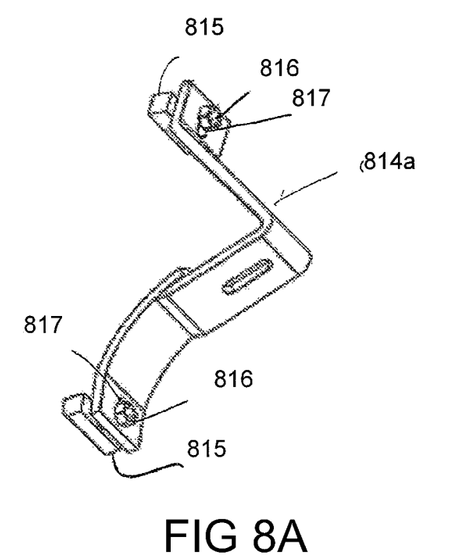
FIG. 8A is a perspective view of an aspect of an exemplary embodiment of the present invention.
Figure 8B:
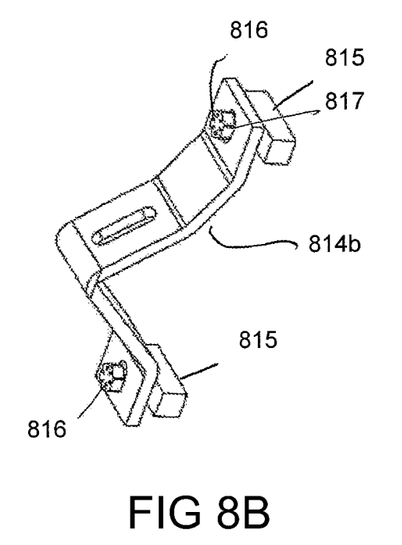
FIG. 8B is a perspective view of an aspect of an exemplary embodiment of the present invention.
Figure 8C:
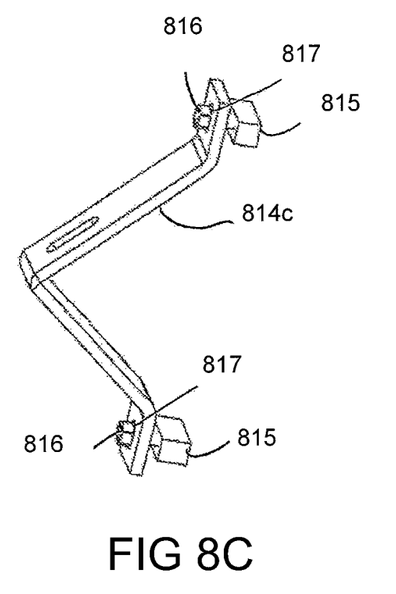
FIG. 8C is a perspective view of an aspect of an exemplary embodiment of the present invention.

Preferably, the clearing member comprises a number of components. For example, a clearing member may comprise a mounting member and a clearing bar. Turning to FIGS. 8A to 8C, such mounting members of the of the present invention are illustrated. FIGS. 8A to 8C show several mounting members 814*a*, 814*b* and 814*c* configured to be mounted onto a track frame under and adjacent to the drive assembly. For example, the mounting members shown in 8A to 8C can be mounted on either the D6H, D6R and D6T Caterpillar high drive track-type tractor (built before 2011), the D6T Caterpillar high drive track-type tractor (built from mid-2011 to present) or the D6N Caterpillar high drive track-type tractor, respectively.

In the illustrated embodiments, holder blocks 815 are to be welded onto the track frame at locations that will not jeopardize the integrity of the track frame's structure. A person skilled in the art would know of locations where the welding of holder blocks 815 will not jeopardize the integrity of the track frame's structure. The mounting member is attached to the holder blocks. Preferably, the mounting member removably attaches to the holder blocks 815. As shown in FIGS. 8A to 8C, the mounting member 814*a*, 814*b*, 814*c* may be attached to the holder blocks 815 by using a bolt 816 that passes through an aperture 817 in the mounting member 814*a*, 814*b*, 814*c* and into a threaded receptacle in the holder blocks 815. A person skilled in the art would know of other ways to mount the mounting member 814*a*, 814*b*, 814*c* onto the track frame suitable for application to embodiments of the present invention.

Figure 9:
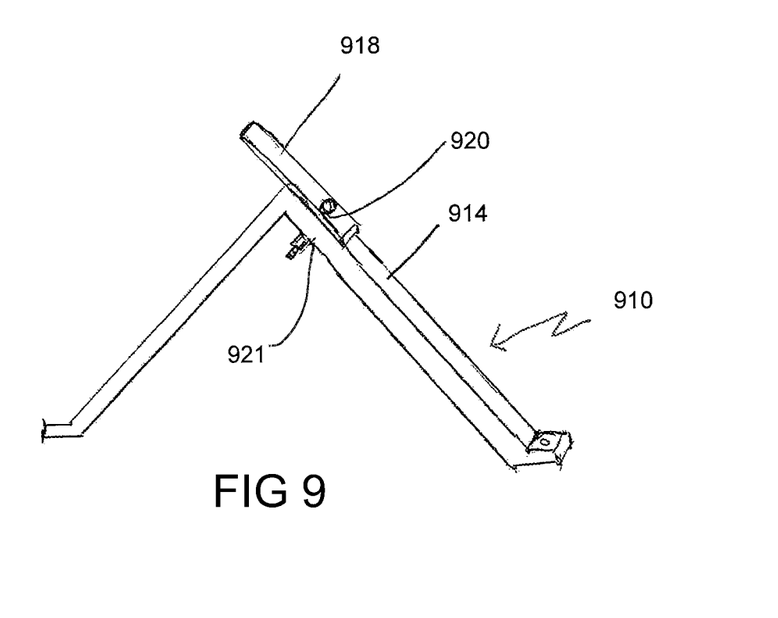
FIG. 9 is a perspective view of an exemplary embodiment of the present invention.

FIG. 9 shows a mounting member 914 with a removably attached clearing bar 918. The clearing bar 918 may removably attach to the mounting member 914 to form a clearing member 910. This allows for replacement of the clearing bar 918 as it gets worn. The clearing bar 918 may be attached to the mounting member 914 by using a bolt and nut, wherein the bolt passes through apertures 920, 921 in clearing bar 918 and the mounting member 914. A person skilled in the art would know of other ways to attach the clearing bar to the mounting member suitable for application to embodiments of the present invention.

Preferably, the clearing bar 918 is adjustably attached to the mounting member so that it can selectively extend out or retract in relative to the mounting member 914. This would allow for adjustments of the clearing member 910 so that there is a clearance between the clearing bar 918 and drive assembly that is large enough so that contact is avoided during oscillation or vibration of the track frame, while not being too large such that debris can be wedged between the clearing bar 918 and drive assembly 911. For example, approximately 0.25-0.35 inches between the clearing bar 918 and the drive may be a suitable clearance so that when the clearing member 910 clears debris from the drive assembly it provides a suitable clearance between a track link and the drive assembly, while avoiding contact between the clearing bar 918 and the drive. A person skilled in the art would know of a suitable clearance between the cleaning bar 918 and the drive assembly, and would selectively adjust the clearing member 910 accordingly.

The present invention is not limited to a track vehicle with the particular drive assembly as described herein. The present invention may be configured to mount onto other track vehicles while avoiding contact with components of the track vehicle during situations such as track frame oscillation.

Figure 10:
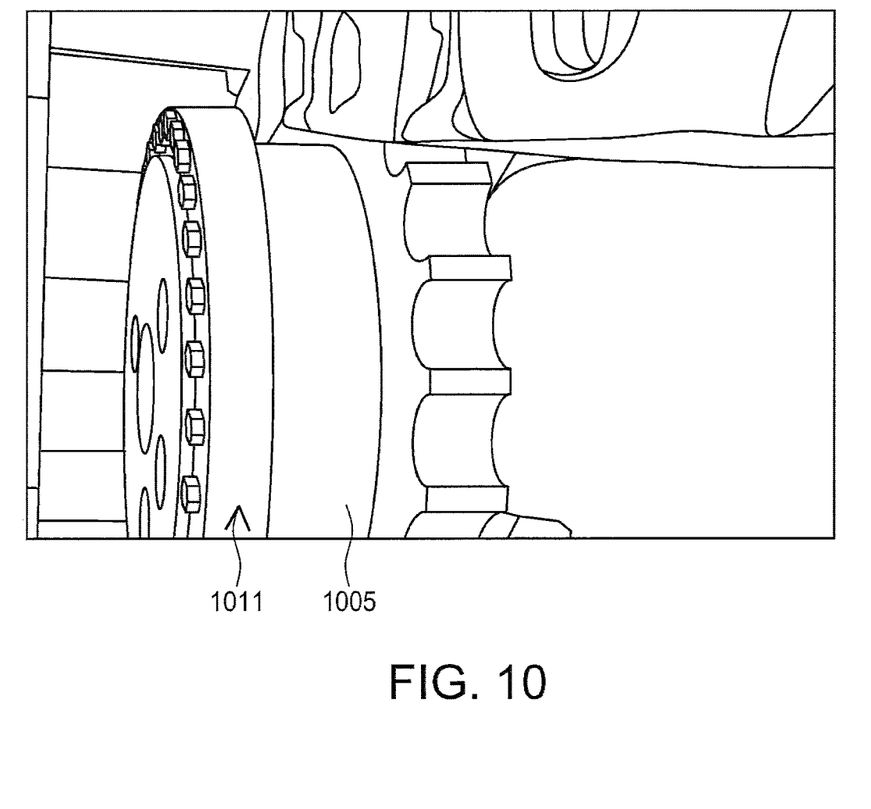
FIG. 10 is a photograph of a drive assembly that has been cleared by the first embodiment of the present invention mounted on a track vehicle.

Turning to FIG. 10, the drive assembly 1011 is illustrated wherein debris has been cleared at the gap 1005 by a clearing member of the present invention.

The present invention further includes track vehicles provided with clearing member/assemblies as described herein.

A person skilled in the art would know of various assemblies suitable for application to embodiments of the present invention.

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to".

"connected", "coupled", or any variant thereof, means any connection or coupling, either direct or indirect, between two or more elements; the coupling or connection between the elements can be physical, logical, or a combination thereof.

"herein", "above", "below", and words of similar import, when used to describe this specification shall refer to this specification as a whole and not to any particular portions of this specification.

"or", in reference to a list of two or more items, covers all of the following interpretations of the word: any of the items in the list, all of the items in the list, and any combination of the items in the list.

the singular forms "a", "an" and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Where a component (e.g. a circuit, module, assembly, device, etc.) is referred to herein, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of methods and apparatus have been described herein for purposes of illustration. These are only examples. The technology provided herein can be applied to contexts other than the exemplary contexts described above. Many alterations, modifications, additions, omissions and permutations are possible within the practice of this invention. This invention includes variations on described embodiments that would be apparent to the skilled person, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

The foregoing is considered as illustrative only of the principles of the invention. The scope of the claims should not be limited by the exemplary embodiments set forth in the foregoing, but should be given the broadest interpretation consistent with the specification as a whole.

The invention claimed is:

1. A track vehicle comprising:
   a track, the track driven by a track link;
   a track frame for supporting the track;
   a drive assembly adjacent to the track frame for driving the track link, the drive assembly comprising:
      an outer flange and an inner sprocket with a gap between the outer flange and the inner sprocket,
   wherein the sprocket is configured to engage with the track link;
   wherein the gap is susceptible to buildup of mud and debris; and
   a clearing member mounted on the track frame adjacent to the drive assembly, the clearing member configured for clearing at least a portion of the mud and debris, the clearing member extending partially into the gap between the outer flange and the inner sprocket,
   wherein the track frame comprises an oscillation pivot point adjacent to the gap allowing for oscillation of the track frame as the track makes contact with an uneven ground surface; and wherein the clearing member is mounted to the track frame at the pivot point.

2. The vehicle of claim 1 wherein the clearing member is mounted to the track frame at the pivot point in a manner such that the clearing member avoids contact with the drive assembly as the track frame oscillates along the pivot point.

3. The vehicle of claim 1 wherein the clearing member comprises:
   a mounting member mounted on the track frame; and
   a clearing bar attached to the mounting member, the clearing bar extending partially into the gap between the outer flange and the inner sprocket.

4. The vehicle of claim 3 wherein the clearing bar is attached to the mounting member in manner such that the clearing member adjustably extends into the gap between the outer flange and the inner sprocket.

5. The vehicle of claim 3 wherein the clearing bar is removably attached to the mounting member.

6. The vehicle of claim 5 wherein the clearing bar is attached to the mounting member in manner such that the clearing member adjustably extends into the gap between the outer flange and the inner sprocket.

7. The vehicle of claim 1 wherein the clearing member is welded to non-stress points of the track frame.

8. A clearing member for mounting to a track vehicle, wherein the track vehicle comprises a track, the track driven by a track link; a track frame for supporting the track; and a drive assembly adjacent to the track frame for driving the track link, the drive assembly comprising an outer flange and an inner sprocket with a gap between the outer flange and the inner sprocket, wherein the sprocket is configured to engage with the track link; and wherein the gap is susceptible to buildup of mud and debris;
   the clearing member is attachable to the track frame of the track vehicle and configured to extend partially into the gap between the outer flange and the inner sprocket and clear at least a portion of the mud and debris, wherein the track frame comprises an oscillation pivot point adjacent to the gap allowing for oscillation of the track frame as the track makes contact with an uneven ground surface; and wherein the clearing member is configured to be attachable to the track frame at the pivot point.

9. The clearing member of claim 8 wherein the clearing member is mounted to the track frame at the pivot point in a manner such that the clearing member avoids contact with the drive assembly as the track frame oscillates along the pivot point.

10. The clearing member of claim 8 wherein the clearing member comprises:

a mounting member mounted on the track frame; and a clearing bar attached to the mounting member, the clearing bar extending partially into the gap between the outer flange and the inner sprocket.

11. The clearing member of claim 10 wherein the clearing bar is attached to the mounting member in manner such that the clearing member adjustably extends into the gap between the outer flange and the inner sprocket.

12. The clearing member of claim 10 wherein the clearing bar is removably attached to the mounting member.

13. The clearing member of claim 12 wherein the clearing bar is attached to the mounting member in manner such that the clearing member adjustably extends into the gap between the outer flange and the inner sprocket.

14. The clearing member of claim 8 wherein the clearing member is welded to non-stress points of the track frame.

15. The vehicle of claim 1 wherein the clearing member is configured for clearing all the mud and debris.

16. The clearing member of claim 8 is configured for clearing all the mud and debris.

* * * * *